United States Patent
Matsumura et al.

(10) Patent No.: US 9,059,652 B2
(45) Date of Patent: Jun. 16, 2015

(54) MOTOR DRIVE SYSTEM

(75) Inventors: Mitsuyori Matsumura, Kasugai (JP); Toshihiro Katsuda, Toyota (JP); Nao Uchibori, Nisshin (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/236,484

(22) PCT Filed: Aug. 3, 2011

(86) PCT No.: PCT/JP2011/067744
§ 371 (c)(1),
(2), (4) Date: Jan. 31, 2014

(87) PCT Pub. No.: WO2013/018209
PCT Pub. Date: Feb. 7, 2013

(65) Prior Publication Data
US 2014/0176034 A1 Jun. 26, 2014

(51) Int. Cl.
| H02P 1/04 | (2006.01) |
| H02P 3/18 | (2006.01) |
| H01R 13/713 | (2006.01) |
| B60L 3/00 | (2006.01) |
| B60L 3/04 | (2006.01) |
| H02P 5/747 | (2006.01) |
| H02P 23/06 | (2006.01) |

(52) U.S. Cl.
CPC .............. *H02P 3/18* (2013.01); *H01R 13/713* (2013.01); *B60L 3/003* (2013.01); *B60L 3/0061* (2013.01); *B60L 3/04* (2013.01); *H02P 5/747* (2013.01); *H02P 23/06* (2013.01); *Y02T 10/642* (2013.01)

(58) Field of Classification Search
CPC .............................. B60L 3/04; H01R 13/713

USPC ........ 318/430, 139, 400.21, 400.22; 307/328; 361/193
See application file for complete search history.

(56) References Cited

U.S. PATENT DOCUMENTS

| 4,209,816 | A | * | 6/1980 | Hansen ........................ 361/23 |
| 4,307,300 | A | * | 12/1981 | Kisami ........................ 307/9.1 |
| 5,432,387 | A | * | 7/1995 | Kogure et al. ............... 307/328 |
| 7,505,097 | B2 | * | 3/2009 | Luo et al. ..................... 349/113 |
| 2002/0070608 | A1 | * | 6/2002 | Matsuki et al. .............. 307/9.1 |
| 2005/0032404 | A1 | | 2/2005 | Furuta et al. |
| 2009/0051226 | A1 | | 2/2009 | Marukawa et al. |

(Continued)

FOREIGN PATENT DOCUMENTS

| JP | 6-98403 A | 4/1994 |
| JP | H-07-212903 A | 8/1995 |
| JP | 2004-112902 A | 4/2004 |
| JP | 2008-141868 A | 6/2008 |
| JP | 2008-198358 A | 8/2008 |

(Continued)

*Primary Examiner* — Erick Glass
(74) *Attorney, Agent, or Firm* — Sughrue Mion, PLLC (57) ABSTRACT

A motor drive system includes a first interlock mechanism configured to be activated in response to transition to an operable state of an interruption device, to open an open/close device, a second interlock mechanism configured to be activated in response to transition to an openable state of a case containing a power control unit, to open the open/close device, and a control device. The control device is configured to perform, when the first interlock mechanism is activated, a first process of opening the open/close device after shutting down the power control unit, and to perform, when the second interlock mechanism is activated, a second process of opening the open/close device while driving the power control unit, instead of the first process, depending on a counter electromotive voltage generated by a motor.

7 Claims, 9 Drawing Sheets

(56) References Cited

U.S. PATENT DOCUMENTS

2009/0110984 A1 4/2009 Tanaka et al.
2012/0169143 A1* 7/2012 Nakagawa et al. ........... 307/328

FOREIGN PATENT DOCUMENTS

| | | |
|---|---|---|
| JP | 2009-54329 A | 3/2009 |
| JP | 2009-90685 A | 4/2009 |

* cited by examiner

MOTOR DRIVE SYSTEM

CROSS REFERENCE TO RELATED APPLICATIONS

This application is a National Stage of International Application No. PCT/JP2011/067744, filed on Aug. 3, 2011, the contents of all of which are incorporated herein by reference in their entirety.

TECHNICAL FIELD

The present invention relates to motor drive systems, and more particularly to a motor drive system incorporating an interlock mechanism for interrupting an output of a mounted power storage device in accordance with operation by an operator.

BACKGROUND ART

For conventional vehicles, a configuration including an interlock mechanism for interrupting power supply to vehicle-mounted high-voltage equipment has been proposed in order to ensure safety during maintenance and inspection of the high-voltage equipment.

For example, Japanese Patent Laying-Open No. 2009-90685 (Patent Document 1) discloses a hood interlock apparatus installed in an industrial vehicle accommodating a fuel cell unit within an accommodation chamber provided with an openable hood, including a switching contact located on a power supply line for supplying power from the fuel cell unit, opening/closing detection means for detecting opening/closing of the hood, and a controller which opens the switching contact, when the opening/closing detection means detects that the hood is open, so that power supply from the fuel cell unit is shut off.

When the fuel cell is operating, the fuel cell unit and the components to which power is supplied from the fuel cell unit can be at high voltage. According to Patent Document 1, when the hood is open while the fuel cell is operating, power supply from the fuel cell unit can be shut off to prevent contact with such high-voltage parts.

CITATION LIST

Patent Documents

PTD 1: Japanese Patent Laying-Open No. 2009-90685
PTD 2: Japanese Patent Laying-Open No. 2008-198358
PTD 3: Japanese Patent Laying-Open No. 2004-112902
PTD 4: Japanese Patent Laying-Open No. 6-98403
PTD 5: Japanese Patent Laying-Open No. 2009-54329

SUMMARY OF INVENTION

Technical Problem

A vehicle having a motor as a driving source incorporates a PCU (Power Control Unit) for converting electric power from a vehicle-mounted power storage device to electric power for driving the motor. This PCU is a unit including high-voltage equipment such as an inverter and converter stored in a storage box. The storage box is typically covered with a maintenance lid. When the maintenance lid is opened for maintenance and inspection of the PCU, power supply from the power storage device to the PCU is interrupted after forcibly setting the inverter and converter to a non-driven state by cutting off their gates.

If the motor is revolving at high speed during the shutdown of the inverter and the like, a counter electromotive voltage induced in the motor is increased, which may cause a voltage higher than the withstand voltage to be applied to power semiconductor switching elements forming the inverter, resulting in a damage to the elements. To prevent the damage to the switching elements, therefore, a shutdown function of urgently shutting down the inverter is activated. However, because the operation of the inverter is forcibly stopped upon activation of this shutdown function, residual charge stored in a smoothing capacitor cannot be discharged by the motor in a short time.

The present invention has been made to solve such problems, and an object of the present invention is to provide a motor drive system ensuring sufficient safety for an operator of a PCU.

Solution to Problem

According to an aspect of the present invention, a motor drive system includes a rechargeable power storage device, a power control unit configured to drive a motor by using electric power supplied from the power storage device, an open/close device disposed on a power line connecting the power storage device to the power control unit, a first interlock mechanism configured to be activated to open the open/close device in response to transition to an operable state of an interruption device for interrupting an output of the power storage device, a second interlock mechanism configured to be activated to open the open/close device in response to transition to an openable state of a case containing the power control unit, and a control device for controlling the power control unit and the first and second interlock mechanisms. The power control unit includes an inverter for converting the electric power from the power storage device to electric power for driving the motor, and a capacitor connected to a terminal of the inverter on the side of the power storage device. The control device is configured to perform, when the first interlock mechanism is activated, a first process of opening the open/close device after shutting down the power control unit, and to perform, when the second interlock mechanism is activated, a second process of opening the open/close device while driving the power control unit, instead of the first process, depending on a counter electromotive voltage generated by the motor.

Preferably, during the second process, the control device controls a voltage applied to the capacitor by driving the power control unit.

Preferably, the power control unit further includes a converter provided between the power storage device and the capacitor. During the second process, the control device controls the inverter and the converter so as to supply electric power from the power control unit to the power storage device.

Preferably, during the second process, the control device controls the inverter so as to drive the motor by field weakening control.

Preferably, the control device controls the inverter so as to discharge residual charge stored in the capacitor, after opening the open/close device.

Preferably, the control device controls the inverter so as to cause the motor to generate braking torque after opening the open/close device, and controls the inverter so as to discharge the residual charge stored in the capacitor when a revolution speed of the motor decreases by the braking torque.

Preferably, the control device controls the inverter so as to cause the motor to generate braking torque based on electromagnetic action.

Advantageous Effects of Invention

According to the present invention, if a counter electromotive voltage induced in the motor is high when the interlock mechanism of the PCU which is high-voltage equipment is activated, an appropriate process can be performed to prevent the application of an excessive counter electromotive voltage to the inverter and the like. As a result, after power supply from the power storage device is interrupted, residual charge stored in a smoothing capacitor can be discharged in a short time to ensure safety for an operator of the high-voltage equipment.

DESCRIPTION OF EMBODIMENTS

Embodiments of the present invention will be hereinafter described in detail with reference to the drawings, in which the same or corresponding elements are designated by the same reference characters and description thereof will not be repeated.

Figure 1:
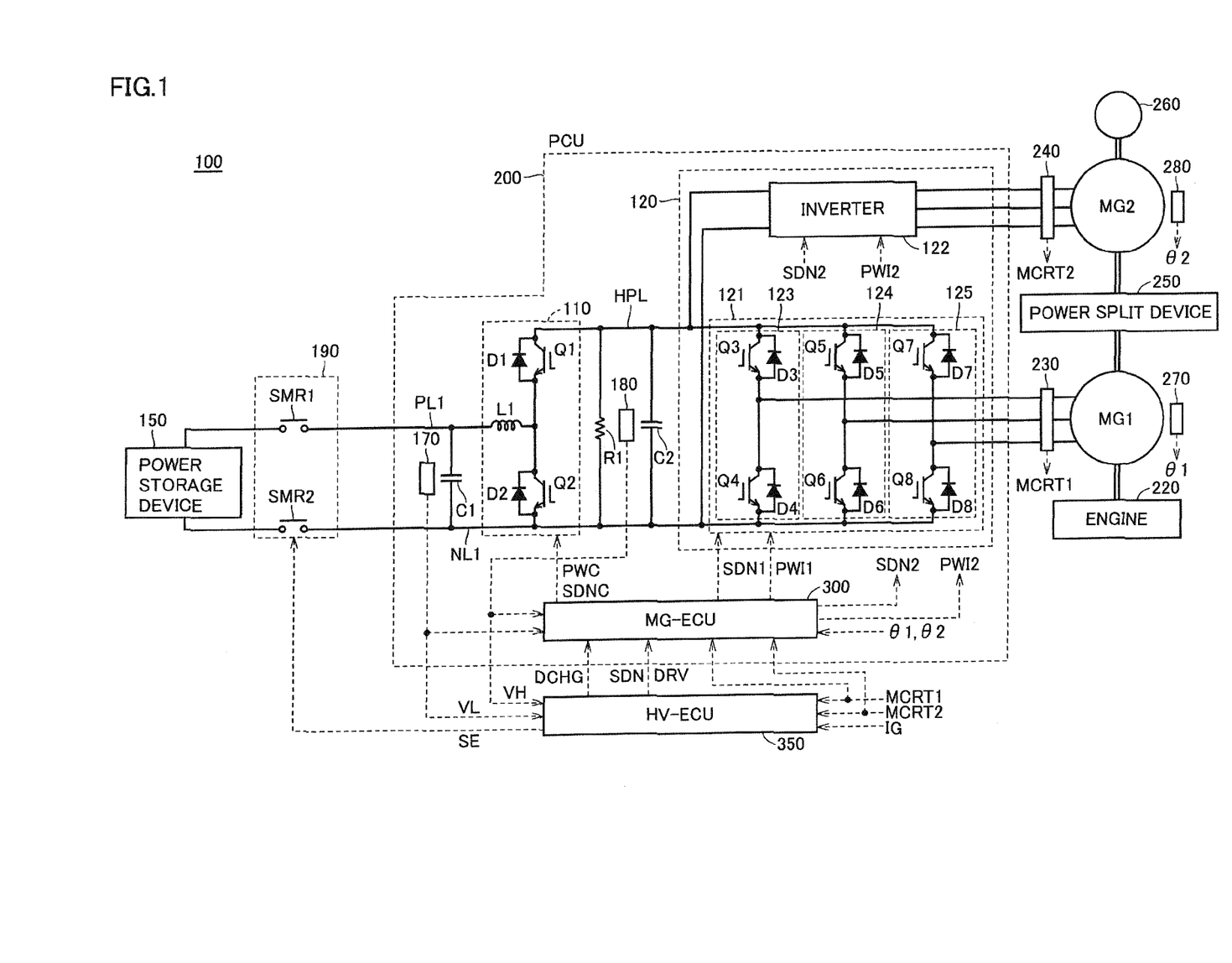
FIG. 1 is a schematic configuration diagram of a vehicle incorporating a motor drive system according to an embodiment of the present invention.

FIG. 1 is a schematic configuration diagram of a vehicle 100 incorporating a motor drive system according to an embodiment of the present invention. Although a hybrid vehicle incorporating an engine and a motor generator is described by way of example as vehicle 100 in this embodiment, vehicle 100 is not limited to this configuration. Any vehicle incorporating a motor generator and a power storage device capable of exchanging electric power with the motor generator is applicable. Examples of vehicle 100 include an electric vehicle and a fuel cell vehicle, in addition to a hybrid vehicle. Although vehicle 100 is described by way of example as including two inverters and corresponding motor generators in this embodiment, the present invention is applicable to a configuration including one inverter and motor generator, or a configuration including three or more inverters and motor generators.

Referring to FIG. 1, vehicle 100 includes a power storage device 150, a PCU 200, motor generators MG1 and MG2, a power split device 250, an engine 220, a drive wheel 260, a system main relay 190, current sensors 230 and 240, revolution angle sensors 270 and 280, and an HV-ECU (Electronic Control Unit) 350.

Power storage device 150 is a rechargeable electric power storage element, and is typically implemented as a secondary battery such as a lithium-ion battery or a nickel-metal hydride battery. Alternatively, power storage device 150 may be formed of an electric power storage element other than a battery, such as an electric double layer capacitor.

Power storage device 150 is connected to PCU 200 through system main relay 190 by a power supply line PL1 and a ground line NL1. Power storage device 150 supplies DC power for driving motor generators MG1 and MG2 to PCU 200. Power storage device 150 also stores electric power generated by motor generators MG1 and MG2 and supplied through PCU 200.

System main relay 190 includes relays SMR1 and SMR2. Relays SMR1 and SMR2 are disposed on power supply line PL1 and ground line NL1, respectively. System main relay 190 switches between supply and interruption of electric power between power storage device 150 and PCU 200, by being controlled so that it is set to a conducting state (ON)/non-conducting state (OFF) by a control signal SE from HV-ECU 350. System main relay 190 is used as a typical example of an "open/close device" capable of interrupting a charge/discharge path of power storage device 150. In other words, system main relay 190 can be replaced by an open/close device in any form.

PCU 200 is configured to convert electric power bi-directionally between motor generators MG1, MG2 and power storage device 150. Specifically, PCU 200 converts DC power from power storage device 150 to AC power for driving motor generators MG1 and MG2. PCU 200 also converts AC power generated by motor generators MG1 and MG2 to DC power for charging power storage device 150.

Motor generators MG1 and MG2 are AC rotating electric machines, for example, permanent magnet synchronous motors including a rotor into which a permanent magnet is incorporated and a stator having coils of three phases Y-connected at a neutral point.

An output torque of motor generators MG1 and MG2 is transmitted to drive wheel 260 through power split device 250 including a reduction gear and power split device, to drive vehicle 100. During regenerative braking of vehicle 100, motor generators MG1 and MG2 can generate electric power by a torque of drive wheel 260. The generated power is then converted by a converter 110 and an inverter 120 to electric power for charging power storage device 150.

Motor generators MG1 and MG2 are coupled to engine 220 through power split device 250. Motor generators MG1, MG2 and engine 220 are operated in a cooperative manner by HV-ECU 350 to generate a required force driving the vehicle. Furthermore, motor generators MG1 and MG2 can generate electric power by rotation of engine 220, and this generated power can be used to charge power storage device 150. In this embodiment, motor generator MG2 is used mainly as a motor for driving drive wheel 260, while motor generator MG1 is used mainly as a power generator driven by engine 220.

Power split device 250 includes a planetary gear mechanism (planetary gear) so as to split motive power of engine 220 into drive wheel 260 and motor generator MG1.

Current sensors 230 and 240 detect motor currents (i.e., inverter output currents) MCRT1 and MCRT2 flowing through motor generators MG1 and MG2, respectively, and output the detected motor currents to an MG-ECU 300 and HV-ECU 350. Since the sum of instantaneous values of currents iu, iv and iw of U, V and W phases is zero, current sensors 230 and 240 should only be disposed so as to detect motor currents of two phases out of the U, V and W phases (e.g., V-phase current iv and W-phase current iw).

Revolution angle sensors (e.g. resolvers) 270 and 280 detect revolution angles θ1 and θ2 of motor generators MG1 and MG2, respectively, and transmit detected revolution angles θ1 and θ2 to MG-ECU 300. MG-ECU 300 allows the calculation of revolution speeds and angular speeds of motor generators MG1 and MG2 based on revolution angles θ1 and θ2. Alternatively, revolution angles θ1 and θ2 may be calculated directly from motor voltage and current in MG-ECU 300, without disposing revolution angle sensors 270 and 280.

PCU 200 includes converter 110, inverter 120, smoothing capacitors C1 and C2, a resistor R1, voltage sensors 170 and 180, and MG-ECU 300. Inverter 120 includes an inverter 121 for driving motor generator MG1 and an inverter 122 for driving motor generator MG2.

Converter 110 includes a reactor L1 having one end connected to power supply line PL1, switching elements Q1 and Q2 connected in series between a power supply line HPL and ground line NL1, and diodes D1 and D2 connected in parallel to switching elements Q1 and Q2, respectively. IGBTs (Insulated Gate Bipolar Transistors), bipolar transistors, MOSFETs (Metal Oxide Semiconductor Field Effect Transistors), GTOs (Gate Turn Off Thyristors) or the like are typically used as the switching elements. In this embodiment, IGBTs are used by way of example as the switching elements.

Reactor L1 has the other end connected to the emitter of switching element Q1 and the collector of switching element Q2. Diode D1 has a cathode connected to the collector of switching element Q1, and has an anode connected to the emitter of switching element Q1. Diode D2 has a cathode connected to the collector of switching element Q2, and has an anode connected to the emitter of switching element Q2.

Switching elements Q1 and Q2 are controlled so that they are turned on or off in response to a control signal PWC from MG-ECU 300.

Inverter 121 drives motor generator MG1 for starting engine 220, for example, in response to a boosted voltage from converter 110. Inverter 121 outputs regenerative electric power, which is generated by motor generator MG1 from the mechanical motive power transmitted from engine 220, to converter 110. At this time, converter 110 is controlled by MG-ECU 300 so that it operates as a down-conversion circuit.

Inverter 121 includes a U-phase arm 123, a V-phase arm 124 and a W-phase arm 125. U-phase arm 123, V-phase arm 124 and W-phase arm 125 are connected in parallel between power supply line HPL and ground line NL1.

U-phase arm 123 includes switching elements Q3 and Q4 connected in series between power supply line HPL and ground line NL1, and diodes D3 and D4 connected in parallel to switching elements Q3 and Q4, respectively. Diode D3 has a cathode connected to the collector of switching element Q3, and has an anode connected to the emitter of switching element Q3. Diode D4 has a cathode connected to the collector of switching element Q4, and has an anode connected to the emitter of switching element Q4.

V-phase arm 124 includes switching elements Q5 and Q6 connected in series between power supply line HPL and ground line NL1, and diodes D5 and D6 connected in parallel to switching elements Q5 and Q6, respectively. Diode D5 has a cathode connected to the collector of switching element Q5, and has an anode connected to the emitter of switching element Q5. Diode D6 has a cathode connected to the collector of switching element Q6, and has an anode connected to the emitter of switching element Q6.

W-phase arm 125 includes switching elements Q7 and Q8 connected in series between power supply line HPL and ground line NL1, and diodes D7 and D8 connected in parallel to switching elements Q7 and Q8, respectively. Diode D7 has a cathode connected to the collector of switching element Q7, and has an anode connected to the emitter of switching element Q7 Diode D8 has a cathode connected to the collector of switching element Q8, and has an anode connected to the emitter of switching element Q8.

Motor generator MG1 is a three-phase AC motor generator, for example, including a rotor into which a permanent magnet is incorporated and a stator having coils of three phases Y-connected at a neutral point. Three coils (not shown) of the U, V and W phases of motor generator MG1 each has one end connected to the neutral point. The U-phase coil has the other end connected to a node between switching elements Q3 and Q4. The V-phase coil has the other end connected to a node between switching elements Q5 and Q6. The W-phase coil has the other end connected to a node between switching elements Q7 and Q8.

Inverter 121 converts the DC power from converter 110 to desired AC power by turning switching elements Q3 to Q8 on or off in response to a control signal PWI1 from MG-ECU 300.

In response to a shutdown command SDN1 from MG-ECU 300, inverter 121 cuts off the gates of switching elements Q3 to Q8 to render switching elements Q3 to Q8 non-active. In this manner, inverter 121 interrupts an output current to motor generator MG1.

Inverter 122 is connected in parallel to inverter 121 with respect to converter 110.

Inverter 122 converts the DC voltage from converter 110 to a three-phase alternating current and outputs the current to motor generator MG2 that drives drive wheel 260. During regenerative braking, inverter 122 outputs the regenerative electric power generated by motor generator MG2 to converter 110. At this time, converter 110 is controlled by MG-ECU 300 so that it operates as a down-conversion circuit. Although not shown, the internal configuration of inverter 122 is similar to that of inverter 121, and detailed description thereof will not be repeated.

Smoothing capacitor C1 is connected between power supply line PL1 and ground line NL1, and absorbs a ripple voltage during switching of switching elements Q1 and Q2 Smoothing capacitor C2 is connected between power supply line HPL and ground line NL1, and absorbs a ripple voltage generated during switching in converter 110 and inverter 120.

Voltage sensor 170 detects a voltage VL across opposing ends of smoothing capacitor C1, and outputs detected voltage VL to MG-ECU 300 and HV-ECU 350. Voltage sensor 180 detects a voltage VH across opposing ends of smoothing capacitor C2, namely, an output voltage of converter 110 (which corresponds to an input voltage of inverter 120), and outputs detected voltage VH to MG-ECU 300 and HV-ECU 350.

Resistor R1 is connected in parallel to smoothing capacitor C2 between power supply line HPL and ground line NL1. Resistor R1 is a resistor having a relatively high resistance value, and gradually discharges residual charge stored in smoothing capacitors C1 and C2 after the vehicle running.

Although not shown, MG-ECU 300 includes a CPU (Central Processing Unit), a storage device and an input/output buffer, and controls converter 110 and inverter 120 in PCU 200. Such control is not limited to software processing, but may be processed by building dedicated hardware (electronic circuitry).

MG-ECU 300 receives the detected values of motor currents MCRT1 and MCRT2 flowing through motor generators MG1 and MG2 detected by current sensors 230 and 240, respectively. MG-ECU 300 receives the detected values of revolution angles θ1 and θ2 of motor generators MG1 and MG2 detected by revolution angle sensors 270 and 280. MG-ECU 300 also receives the detected values of voltages VL and VH across the opposing ends of smoothing capacitors C1 and C2 detected by voltage sensors 170 and 180. MG-ECU 300 further receives a discharge command DCHG and a shutdown command SDN from HV-ECU 350.

MG-ECU 300 causes the generation of control signal PWC for converter 110, based on voltages VL and VH across the opposing ends of smoothing capacitors C1 and C2. MG-ECU 300 then causes the driving of switching elements Q1 and Q2 of converter 110 by control signal PWC, to cause converter 110 to perform boost operation or down-conversion operation.

MG-ECU 300 causes the generation of control signals PWI1 and PWI2 for driving inverters 121 and 122, based on motor currents MCRT1 and MCRT2 flowing through motor generators MG1 and MG2 detected by current sensors 230 and 240, respectively, and revolution angles θ1 and θ2 of motor generators MG1 and MG2 detected by revolution angle sensors 270 and 280. MG-ECU 300 then causes the driving of the switching elements of inverters 121 and 122 by control signals PWI1 and PWI2, to convert the DC power from converter 110 to AC power for driving motor generators MG1 and MG2.

In response to discharge command DCHG from HV-ECU 350, MG-ECU 300 causes the generation and output of control signals PWI1 and PWI2 to inverters 121 and 122, so as to discharge the residual charge stored in smoothing capacitor C2 by motor generators MG1 and/or MG2.

In response to shutdown command SDN from HV-ECU 350, MG-ECU 300 causes the output of shutdown commands SDN1 and SDN2 for setting inverters 121 and 122 to a non-driven state to inverters 121 and 122, respectively. MG-ECU 300 also causes the output of a shutdown command SDNC for setting converter 110 to a non-driven state to converter 110.

Moreover, in response to a drive command DRV from HV-ECU 350, MG-ECU 300 causes the generation and output of control signals PWI1 and PWI2 to inverters 121, 122 and converter 110, so as to set inverters 121, 122 and converter 110 to a driven state.

Although not shown, HV-ECU 350 includes a CPU, a storage device and an input/output buffer, and controls the devices in vehicle 100. Such control is not limited to software processing, but may be processed by building dedicated hardware (electronic circuitry).

HV-ECU 350 receives the detected values of voltages VL and VH across the opposing ends of smoothing capacitors C1 and C2 detected by voltage sensors 170 and 180. HV-ECU 350 also receives the detected values of motor currents MCRT1 and MCRT2 flowing through motor generators MG1 and MG2 detected by current sensors 230 and 240, respectively. HV-ECU 350 further receives an ignition signal IG indicating an ON/OFF state of a not-shown ignition switch.

HV-ECU 350 causes the generation of relay control signal SE based on ignition signal IG. HV-ECU 350 then controls relays SMR1 and SMR2 of system main relay 190 based on relay control signal SE. Specifically, when a driver turns the ignition switch on to cause switching from an OFF state to an ON state of ignition signal IG, HV-ECU 350 causes the setting of relay control signal SE to ON. When relay control signal SE is set to ON, contacts of relays SMR1 and SMR2 are closed to supply the electric power from power storage device 150 to PCU 200. When relay control signal SE is set to OFF, on the other hand, the contacts of relays SMR1 and SMR2 are opened to interrupt the power supply from power storage device 150 to PCU 200.

When a service cover (not shown) provided on a housing containing power storage device 150 is opened during maintenance of the interior of power storage device 150, for example, HV-ECU 350 causes the output of shutdown command SDN for stopping the driving of motor generators MG1 and MG2 by converter 110 and inverters 121, 122 to MG-ECU 300. In response to shutdown command SDN, MG-ECU 300 causes the cutoff of the gates of inverters 121 and 122, to set converter 110 and inverters 121, 122 to a non-driven state.

Then, when converter 110 and inverters 121, 122 are set to a non-driven state in response to shutdown command SDN as described above, HV-ECU 350 causes the output of relay control signal SE for opening the contacts of relays SMR1 and SMR2 to system main relay 190.

In contrast, when a maintenance lid (not shown) provided on a housing containing PCU 200 is opened during maintenance of the interior of PCU 200, for example, HV-ECU 350 causes the selection of one of shutdown command SDN and drive command DRV described above, and causes the output of the selected command to MG-ECU 300. If shutdown command SDN is output, MG-ECU 300 causes the cutoff of the gates of inverters 121, 122 and converter 110, to set inverters 121, 122 and converter 110 to a non-driven state, as described above. If drive command DRV is output, on the other hand, MG-ECU 300 causes the generation of control signals PWI1, PWI2 and PWC to control inverters 121, 122 and converter 110.

When the contacts of relays SMR1 and SMR2 are opened to interrupt the power supply from power storage device 150 to PCU 200, HV-ECU 350 causes the output of discharge command DCHG for discharging the residual charge stored in smoothing capacitor C2 in a short time to MG-ECU 300.

In the motor drive system according to this embodiment, each of the service cover provided on power storage device 150 and the maintenance lid provided on the housing of PCU 200 functions as an interlock mechanism for interrupting the power supply from power storage device 150 to PCU 200. In this manner, the supply of high voltage can be automatically interrupted during maintenance of high-voltage equipment to ensure safety against high voltage.

Figure 2:
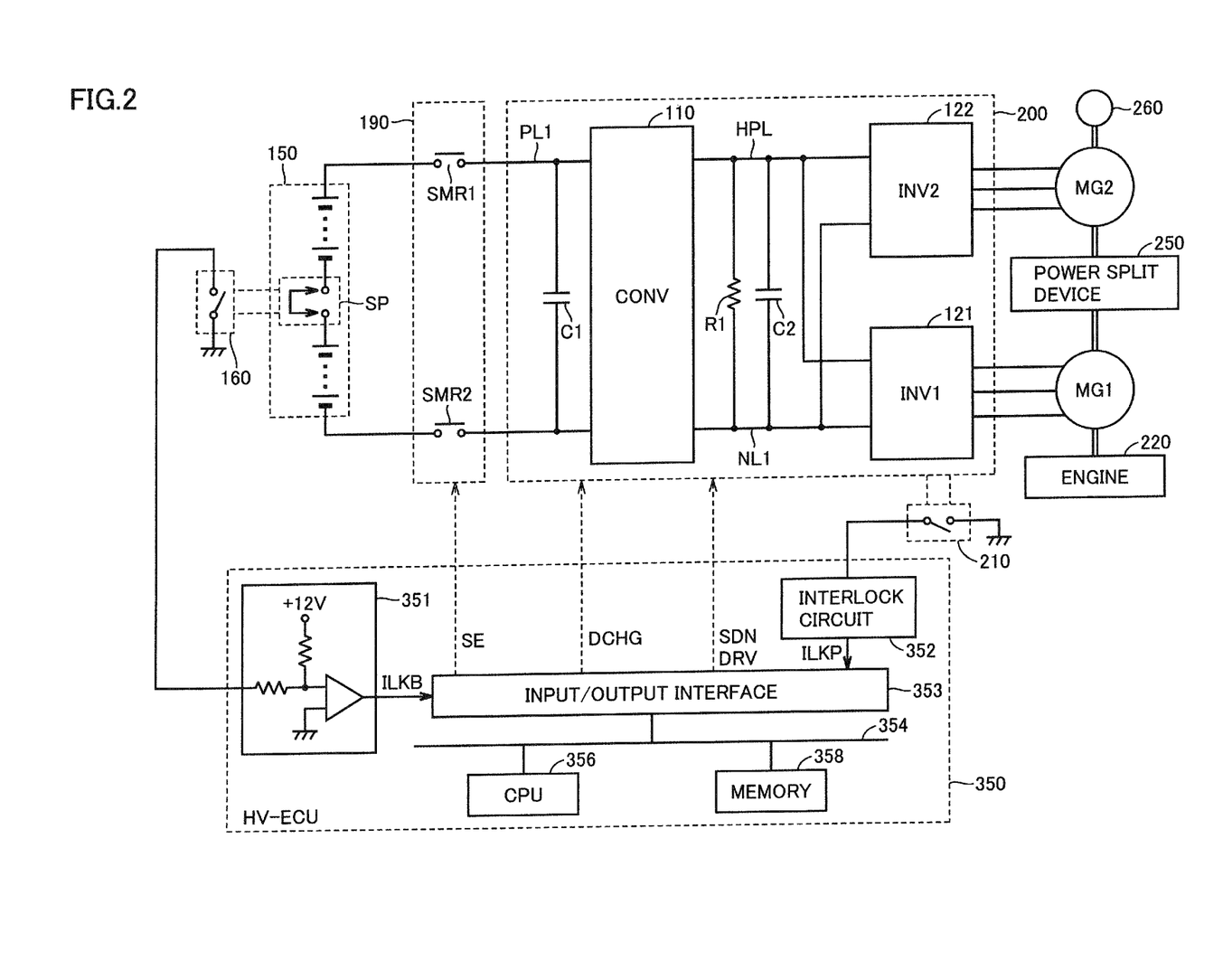
FIG. 2 illustrates an interlock mechanism included in the motor drive system according to the embodiment.

FIG. 2 illustrates the interlock mechanism included in the motor drive system according to this embodiment. In FIG. 2, the elements common to those in FIG. 1 are designated by the same reference characters and description thereof will not be repeated.

Referring to FIG. 2, power storage device 150 includes a plurality of battery cells connected in series, and a service plug SP connected in series between the plurality of battery cells. Service plug SP constitutes an "interruption device" for interrupting the output of storage device 150 in accordance with manual operation by an operator. Service plug SP includes an interlock switch 160 configured in such a manner that its contact is opened when the service cover (not shown) is opened by manual operation by the operator.

Interlock switch 160 is switched from a closed state to an opened state when the user opens the service cover. Interlock switch 160 is electrically connected to an interlock circuit 351 provided within HV-ECU 350.

The housing of PCU 200 is provided with the maintenance lid (not shown). The maintenance lid includes an interlock switch 210 configured in such a manner that its contact is opened when the maintenance lid is opened by the operator's operation, as described above.

Interlock switch 210 is switched from a closed state to an opened state when the operator opens the maintenance lid. Interlock switch 210 is electrically connected to an interlock circuit 352 provided within HV-ECU 350.

HV-ECU 350 includes interlock circuits 351 and 352, an input/output interface 353, a CPU 356, a memory 358, and a bus 354 connecting CPU 356, memory 358 and input/output interface 353 together.

Interlock circuit 351 is provided corresponding to interlock switch 160 of service plug SP. Interlock circuit 351 includes two resistors and a comparator. When interlock switch 160 is in a closed state, namely, when the service cover is closed, the comparator in interlock circuit 351 outputs an interlock signal ILKB of L (logical low) level. When interlock switch 160 is set to an opened sate, namely, when the service cover is opened, the comparator outputs interlock signal ILKB of H (logical high) level. Interlock signal ILKB output from interlock circuit 351 is input to CPU 356 through input/output interface 353 and bus 354.

Interlock circuit 352 is provided corresponding to interlock switch 210 of the maintenance lid. Interlock circuit 352 is configured in a manner similar to interlock circuit 351. When interlock switch 210 is in a closed state, namely, when the maintenance lid is closed, interlock circuit 352 outputs an interlock signal ILKP of L level. When interlock switch 210 is set to an opened sate, namely, when the maintenance lid is opened, interlock circuit 352 outputs interlock signal ILKP of H level. Interlock signal ILKP output from interlock circuit 352 is input to CPU 356 through input/output interface 353 and bus 354.

In response to interlock signal ILKB of H level from interlock circuit 351, CPU 356 causes the output of shutdown command SDN to CPU 200. Furthermore, CPU 356 causes the setting of relay control signal SE to OFF so as to open the contacts of relays SMR1 and SMR2.

As described above, service plug SP has the function of mechanically cutting off an intermediate position of the plurality of battery cells. Thus, when service plug SP is pulled while a current is flowing through power storage device 150, there is a risk that an arc may be generated. When the interlock mechanism is activated in response to the opening of the service cover, therefore, the current flowing through power storage device 150 needs to be reduced to zero immediately (within several tens of seconds). Accordingly, in this embodiment, when interlock signal ILKB is switched from L level to H level, shutdown command SDN is output to PCU 200 to set inverters 121, 122 and converter 110 to a non-driven state. Then, the contacts of relays SMR1 and SMR2 are opened to interrupt the power supply from power storage device 150 to PCU 200.

In contrast, in PCU 200, when the interlock mechanism is activated in response to the opening of the maintenance lid, smoothing capacitor C2 needs to be discharged quickly. Although the charge stored in smoothing capacitor C2 can be consumed by resistor R1, quick discharge is difficult.

When the interlock mechanism of PCU 200 is activated, if shutdown command SDN is immediately output to forcibly set inverters 121, 122 and converter 110 to a non-driven state in a manner similar to when the interlock mechanism of power storage device 150 is activated as described above, and if motor generator MG1 or MG2 is revolving at high speed, there is a risk that an excessive counter electromotive voltage induced in the motor generator may be applied to the switching elements forming the corresponding inverter and to smoothing capacitor C2. For example, when the interlock mechanism of PCU 200 is activated, if motor generator MG1 is revolving at high speed with a driving force received from engine ENG, a counter electromotive voltage induced in motor generator MG1 is increased. Thus, when the driving of inverter 121 is stopped, there is a risk that a voltage higher than the withstand voltage may be applied to switching elements Q3 to Q8 forming inverter 121.

In order to prevent an element failure and the like resulting from the application of an excessive voltage higher than the withstand voltage to switching elements Q3 to Q8, inverters 121 and 122 each have a shutdown function of shutting down the operation of the inverter by cutting off its gate when an inverter input voltage (which corresponds to voltage VH of smoothing capacitor C2) exceeds a predetermined threshold voltage. Thus, when this shutdown function is activated due to the excessive counter electromotive voltage induced in motor generator MG1 as described above, the operation of the inverter is forcibly stopped. Consequently, after the contacts of relays SMR1 and SMR2 are opened to interrupt the power supply from power storage device 150 to PCU 200, the residual charge stored in smoothing capacitor C2 cannot be discharged by motor generators MG1 and/or MG2 in a short time. As a result, during maintenance of PCU 200, despite the fact that smoothing capacitor C2 needs to be discharged quickly in response to the activation of the interlock mechanism, there is a risk that smoothing capacitor C2 may not be discharged.

In the motor drive system according to this embodiment, therefore, when the interlock mechanism of PCU 200 is activated, the control of PCU 200 is switched as described below depending on the magnitude of a counter electromotive voltage induced in motor generator MG1.

Figure 3:
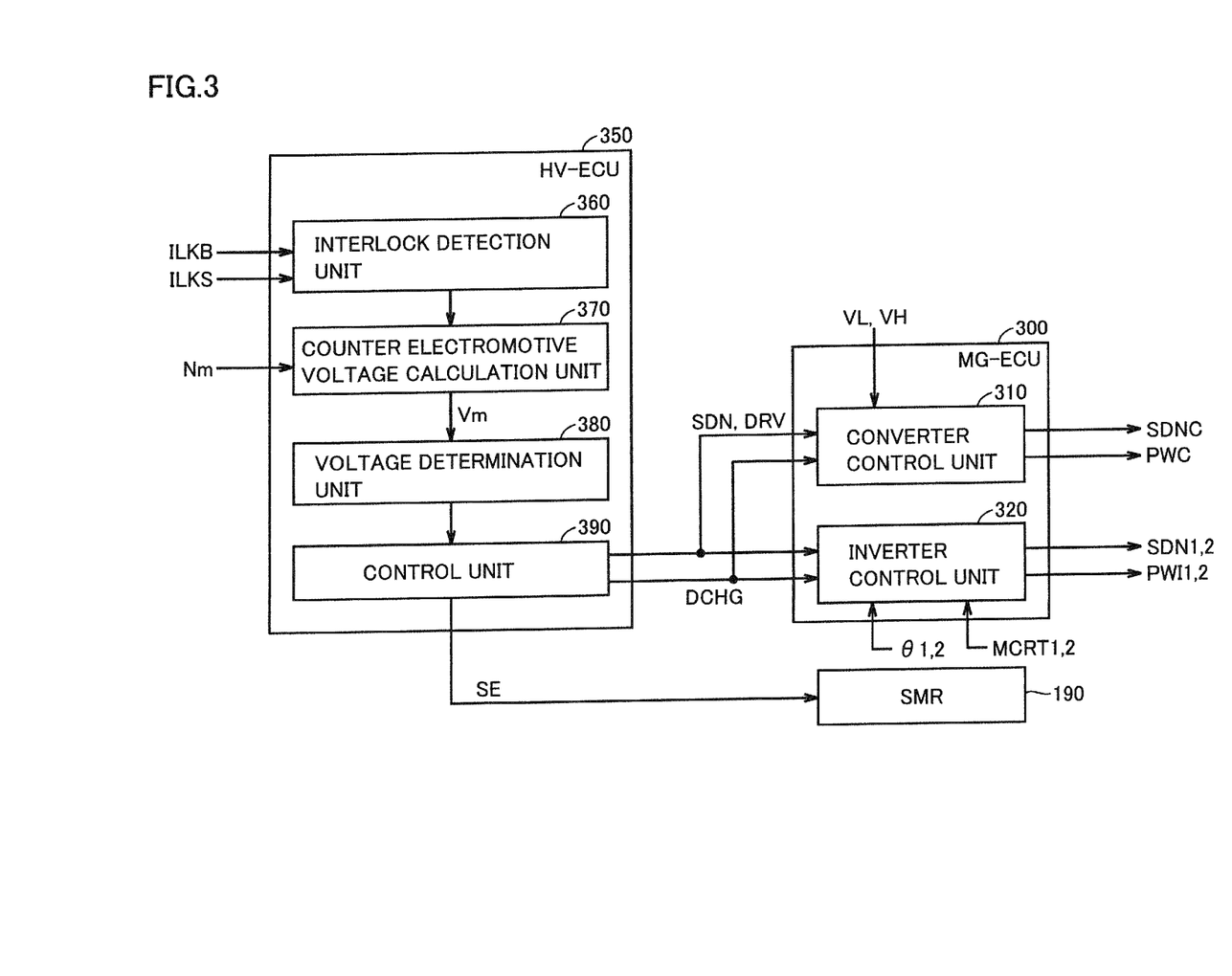
FIG. 3 is a functional block diagram illustrating control of a PCU when the interlock mechanism is activated in the motor drive system according to the embodiment.

FIG. 3 is a functional block diagram illustrating the control of PCU 200 when the interlock mechanism is activated in the motor drive system according to this embodiment. The functional blocks shown in FIG. 3 can be implemented by software processing executed by HV-ECU 350 in accordance with a preset program. Alternatively, a circuit (hardware) having a function corresponding to this function can be configured within HV-ECU 350.

Referring to FIG. 3, HV-ECU 350 includes an interlock detection unit 360, a counter electromotive voltage calculation unit 370, a voltage determination unit 380, and a control unit 390.

Interlock detection unit 360 receives interlock signal ILKB from interlock circuit 351 (FIG. 2), and receives interlock signal ILKP from interlock circuit 352 (FIG. 2). Based on interlock signal ILKB, interlock detection unit 360 detects that interlock switch 160 of service plug SP (FIG. 2) has been set to an opened state, namely, that the interlock mechanism of power storage device 150 has been activated. Based on interlock signal ILKP, interlock detection unit 360 detects that the interlock mechanism of PCU 200 has been activated. Interlock detection unit 360 outputs the detection result to counter electromotive voltage calculation unit 370.

Counter electromotive voltage calculation unit 370 calculates a counter electromotive voltage Vm of motor generator MG1 based on a revolution speed of motor generator MG1. Generally, a counter electromotive voltage (induced voltage) of a motor is proportional to a revolution speed of the motor. Thus, if a counter electromotive voltage per unit revolution speed of a motor (namely, proportionality factor) has been predetermined, the counter electromotive voltage can be calculated based on the motor revolution speed. Counter electromotive voltage calculation unit 370 stores the predetermined proportionality factor, and calculates counter electromotive voltage Vm by multiplying the revolution speed of motor generator MG1 by the proportionality factor.

In response to counter electromotive voltage Vm calculated by counter electromotive voltage calculation unit 370, voltage determination unit 380 determines whether or not counter electromotive voltage Vm is higher than a predetermined threshold voltage. The predetermined threshold voltage is a threshold value for determining whether or not the shutdown function of inverters 121 and 122 is activated in response to the application of a voltage higher than the withstand voltage to inverters 121 and 122. This threshold voltage is predetermined in such a manner that switching elements Q3 to Q8 forming inverters 121 and 122 are not damaged in consideration of the withstand voltage of these elements. Voltage determination unit 380 outputs the determination result to control unit 390.

Control unit 390 controls converter 110 and inverters 122, 122 based on the detection result from interlock detection unit 360 and the determination result from voltage determination unit 380. Control unit 390 causes the output of one of shutdown command SDN and drive command DRV to MG-ECU 300.

MG-ECU 300 includes a converter control unit 310 and an inverter control unit 320. Converter control unit 310 and inverter control unit 320 receive shutdown command SDN and drive command DRV generated by control unit 390.

Converter control unit 310 causes the generation of control signal PWC for converter 110 based on voltages VL and VH across the opposing ends of smoothing capacitors C1 and C2. Converter control unit 310 causes the driving of switching elements Q1 and Q2 of converter 110 by control signal PWC, to cause converter 110 to perform boost operation or down-conversion operation.

In response to shutdown command SDN from control unit 390, converter control unit 310 causes the output of shutdown command SDNC for setting converter 110 to a non-driven state to converter 110.

In response to drive command DRV from control unit 390, on the other hand, converter control unit 310 causes the generation and output of control signal PWC to converter 110, so as to cause converter 110 to perform down-conversion operation.

Inverter control unit 320 causes the generation of control signals PWI1 and PWI2 for inverters 121 and 122, based on motor currents MCRT1 and MCRT2 detected by current sensors 230 and 240, and revolution angles θ1 and θ2 of motor generators MG1 and MG2 detected by revolution angle sensors 270 and 280. Inverter control unit 320 causes the driving of the switching elements of inverters 121 and 122 by control signals PWI1 and PWI2, to convert the DC power from converter 110 to AC power for driving motor generators MG1 and MG2.

In response to shutdown command SDN from control unit 390, inverter control unit 320 causes the output of shutdown commands SDN1 and SDN2 for setting inverters 121 and 122 to a non-driven state to inverters 121 and 122, respectively.

In response to drive command DRV from control unit 390, on the other hand, inverter control unit 320 causes the generation and output of control signal PWI1 to inverter 121, so as to convert counter electromotive voltage Vm induced in motor generator MG1 to a DC voltage. In this manner, when drive command DRV is supplied from control unit 390, inverter 121 converts the counter electromotive voltage induced in motor generator MG1 to a DC voltage, and supplies the resultant DC voltage to converter 110 through smoothing capacitor C2. Then, converter 110 down-coverts the DC voltage supplied from inverter 121, and outputs the resultant voltage to power supply line PL1 and ground line NL1.

After outputting one of shutdown command SDN and drive command DRV to MG-ECU 300, control unit 390 further causes the setting of relay control signal SE to OFF. Thus, the contacts of relays SMR1 and SMR2 are opened to interrupt the power supply from power storage device 150 to PCU 200.

When the power supply from power storage device 150 to PCU 200 is interrupted, control unit 390 causes the output of discharge command DCHG to MG-ECU 300. In response to discharge command DCHG from control unit 390, inverter control unit 320 causes the generation and output of control signals PWI1 and PWI2 to inverters 121 and 122, so as to discharge the residual charge stored in smoothing capacitor C2 by motor generators MG1 and/or MG2.

Figure 4:
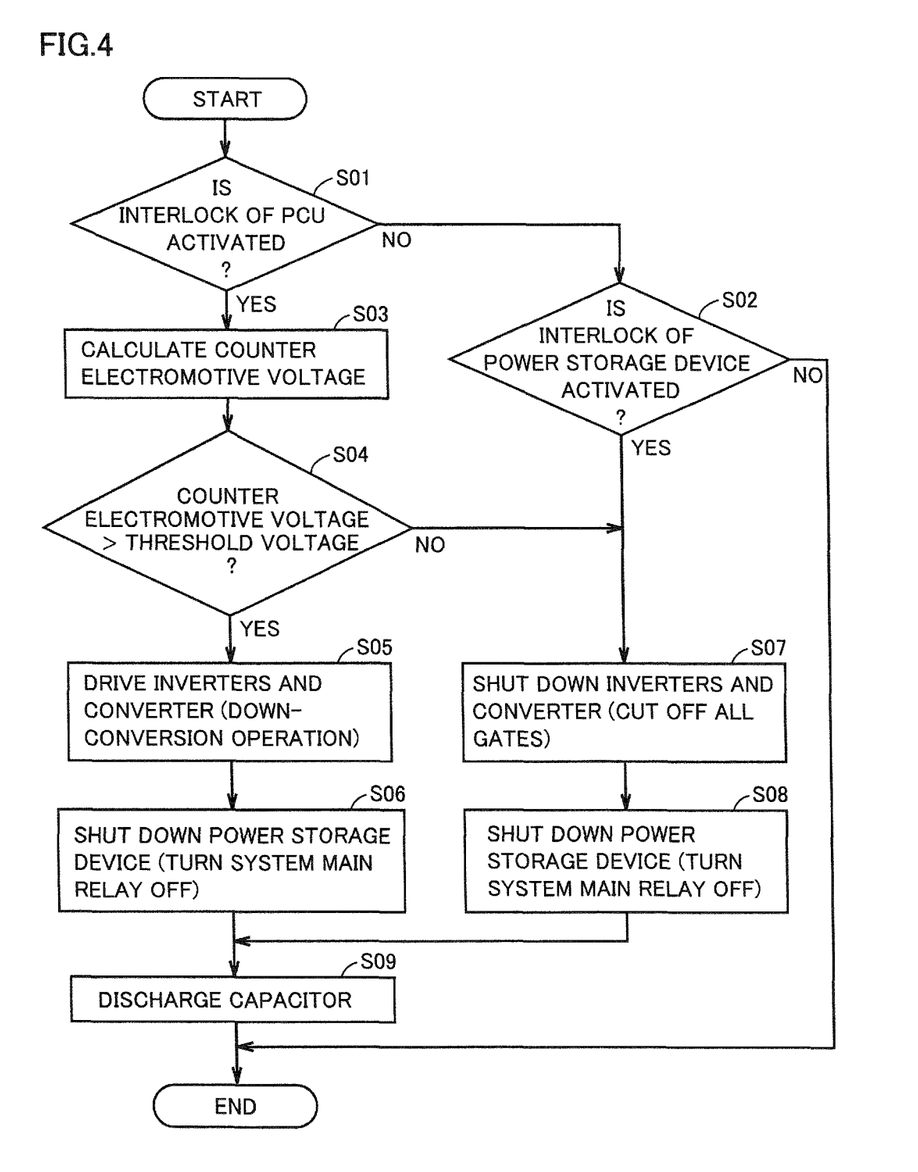
FIG. 4 is a flowchart illustrating the control of the PCU performed by an HV-ECU when the interlock mechanism is activated, in the motor drive system according to the embodiment of the present invention.

FIG. 4 is a flowchart illustrating the control of PCU 200 performed by HV-ECU 350 when the interlock mechanism is activated, in the motor drive system according to the embodiment of the present invention. The control process in accordance with the flowchart shown in FIG. 4 is implemented by HV-ECU 350 executing a prestored program at regular intervals.

Referring to FIG. 4, in step S01, HV-ECU 350 causes a determination to be made of whether of not the interlock mechanism of PCU 200 is activated. If the interlock mechanism of PCU 200 is not activated (NO in the determination of step S01), in step S02, HV-ECU 350 causes a determination to be made of whether of not the interlock mechanism of power storage device 150 is activated. That is, the processing of steps S01 and S02 corresponds to the operation of interlock detection unit 360 shown in FIG. 3. If the interlock mechanism of power storage device 150 is not activated (NO in the determination of step S02), the subsequent processing is not performed and the process ends.

If the interlock mechanism of PCU 200 is activated (YES in the determination of step S01), in step S03, HV-ECU 350 causes the calculation of counter electromotive voltage Vm of motor generator MG1. The processing of step S03 corresponds to the operation of counter electromotive voltage calculation unit 370 shown in FIG. 3. Counter electromotive voltage calculation unit 370 calculates counter electromotive voltage Vm by multiplying a revolution speed of motor generator MG1 by a predetermined proportionality factor.

In step S04, HV-ECU 350 causes a determination to be made of whether of not counter electromotive voltage Vm is higher than a predetermined threshold voltage. That is, the processing of step S04 corresponds to the operation of voltage determination unit 380 shown in FIG. 3. If it is determined that counter electromotive voltage Vm is higher than the threshold voltage (YES in the determination of step S04), the process proceeds to step S05. If it is determined that counter electromotive voltage Vm is not higher than the threshold voltage (NO in the determination of step S04), on the other hand, the process proceeds to step S07.

Figure 5:
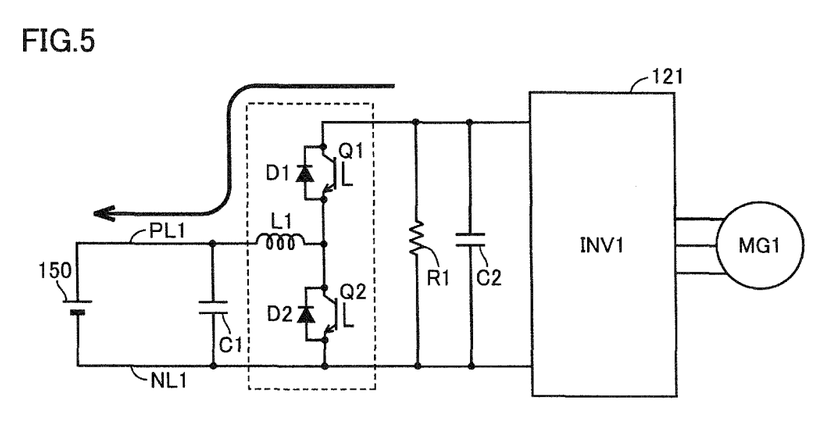
FIG. 5 illustrates the processing of step S05 shown in FIG. 4.

In step S05, HV-ECU 350 causes control unit 390 shown in FIG. 3 to output drive command DRV to MG-ECU 300. In response to drive command DRV, MG-ECU 300 causes inverter control unit 320 and converter control unit 310 shown in FIG. 3 to drive inverters 121, 122 and converter 110. Counter electromotive voltage Vm induced in motor generator MG1 is thus converted to a DC voltage by inverter 121. The resultant DC voltage is down-converted by converter 110 and output to power supply line PL1 and ground line NL1. The down-conversion operation of converter 110 is performed, as shown in FIG. 5, by supplying electromagnetic energy stored in reactor L1 during an ON period of switching element Q1 to power supply line PL1 through switching element Q2 and anti-parallel diode D2.

Then, in step S06, HV-ECU 350 causes the setting of relay control signal SE to OFF and the output of this signal to system main relay 190. Thus, the contacts of relays SMR1 and SMR2 are opened to interrupt the power supply from power storage device 150 to PCU 200.

In step S07, on the other hand, HV-ECU 350 causes control unit 390 shown in FIG. 3 to output shutdown command SDN to MG-ECU 300. In response to shutdown command SDN, MG-ECU 300 causes inverter control unit 320 and converter control unit 310 shown in FIG. 3 to cut off the gates of inverters 121, 122 and converter 110, to set inverters 121, 122 and converter 110 to a non-driven state.

Then, in step S08, HV-ECU 350 causes the setting of relay control signal SE to OFF and the output of this signal to system main relay 190. Thus, the contacts of relays SMR1 and SMR2 are opened to interrupt the power supply from power storage device 150 to PCU 200.

When the power supply from power storage device 150 to PCU 200 is interrupted in step S06 or S08, in step S09, HV-ECU 350 causes the generation and output of control signals PWI1 and PWI2 to inverters 121 and 122, so as to discharge the residual charge stored in smoothing capacitor C2 by motor generators MG1 and/or MG2.

In the processing of step S09, specifically, control signals PWI1 and PWI2 are generated so that only a d-axis current component of a command for a current after three-phase/two-phase conversion flows, for example. As a result, the residual charge stored in smoothing capacitor C2 can be consumed by motor generators MG1 and MG2 in a short time, without generating a driving force by motor generators MG1 and MG2.

As described above, when the interlock mechanism of PCU 200 is activated, the driving of inverters 121, 122 and converter 110 is stopped if the counter electromotive voltage of motor generator MG1 is not higher than the threshold voltage, whereas inverters 121, 122 and converter 110 are driven to covert the power of the counter electromotive voltage of motor generator MG1 and to output the resultant to power supply line PL1 and ground line NL1 if the counter electromotive voltage exceeds the threshold voltage. In other words, when the counter electromotive voltage exceeds the threshold voltage, voltage VH applied to smoothing capacitor C2 can be controlled by driving inverters 121, 122 and converter 110.

With this configuration, if the counter electromotive voltage of motor generator MG1 is higher than the threshold voltage when the interlock mechanism of PCU 200 is activated, voltage VH applied to smoothing capacitor C2 can be controlled by driving inverters 121, 122 and converter 110 without cutting off their gates. Thus, the application of an excessive counter electromotive voltage to switching elements Q3 to Q8 forming inverters 121 and 122 and smoothing capacitor C2 can be prevented. Accordingly, the forcible stop of the operation of inverters 121 and 122 by the activation of the shutdown function can be avoided, thereby allowing the residual charge stored in smoothing capacitor C2 to be discharged by motor generators MG1 and MG2 in a short time. As a result, the robustness of safety ensured for a worker during maintenance of PCU 200 can be improved.

(First Modification)

In the embodiment described above, the application of an excessive counter electromotive voltage to the inverters and smoothing capacitor C2 is prevented by driving inverters 121, 122 and converter 110 so as to convert the power of the counter electromotive voltage induced in motor generator MG1 and to output the resultant to power supply line PL1 and ground line NL1. According to this configuration, the contacts of relays SMR1 and SMR2 are opened while a current is flowing through relays SMR1 and SMR2, which may cause a damage to the contacts of relays SMR1 and SMR2. It is thus required to set a high value for a permissible current of relays SMR1 and SMR2.

Accordingly, in this first modification, if counter electromotive voltage Vm of motor generator MG1 is higher than the threshold voltage, the driving of converter 110 is stopped, and inverter 121 is driven to perform field weakening control to thereby reduce the counter electromotive voltage of motor generator MG1.

Figure 6:
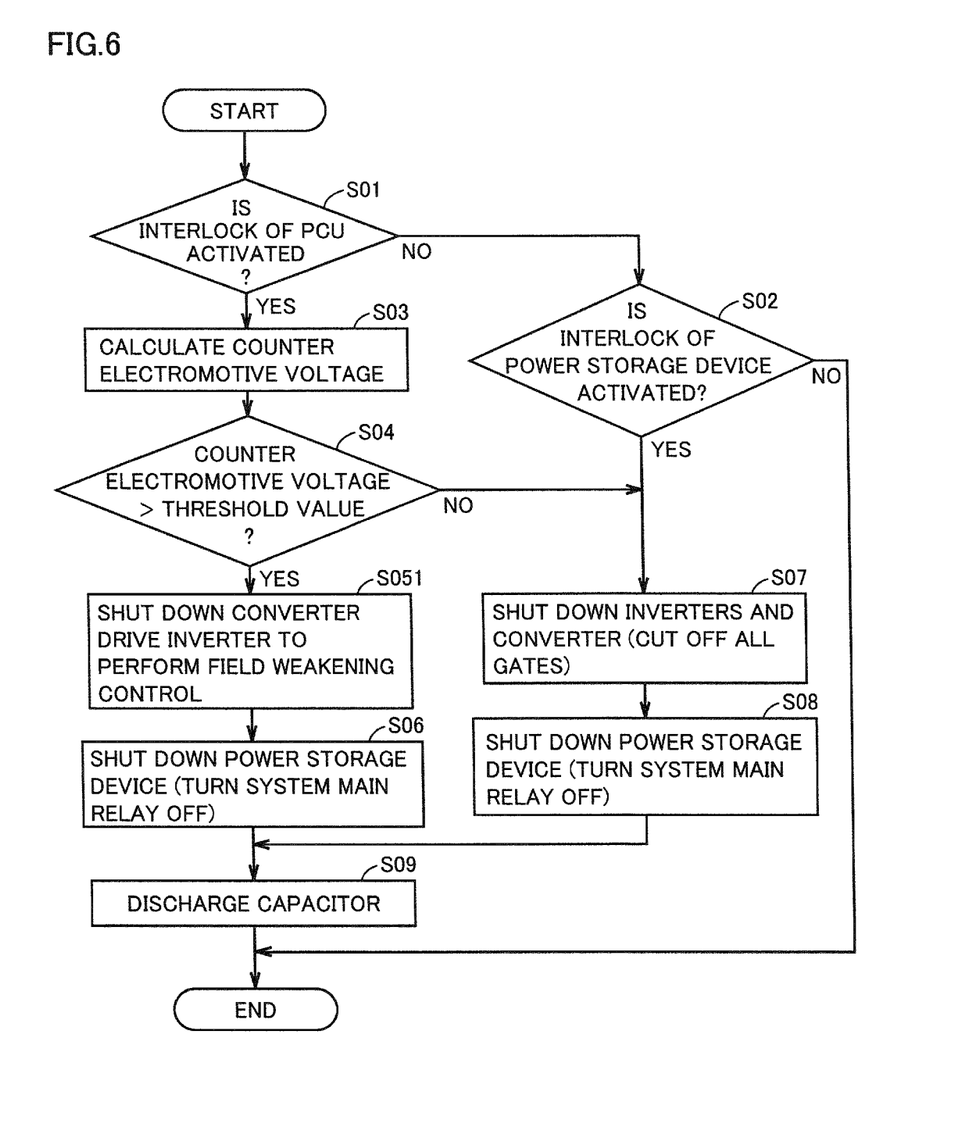
FIG. 6 is a flowchart illustrating the control of the PCU performed by the HV-ECU when the interlock mechanism is activated, in the motor drive system according to a first modification of the embodiment of the present invention.

FIG. 6 is a flowchart illustrating the control of PCU 200 performed by HV-ECU 350 when the interlock mechanism is activated, in the motor drive system according to the first modification of the embodiment of the present invention. In the control of PCU 200 according to this modification, processing of step S051 in the flowchart of FIG. 6 is performed instead of the processing of step S05 in the flowchart of FIG. 4. The remaining control operation can be similar to that of FIG. 4, and therefore description thereof will not be repeated.

Referring to FIG. 6, if counter electromotive voltage Vm induced in motor generator MG1 is higher than the threshold voltage (YES in the determination of step S04), in step S051, HV-ECU 350 causes the stop of the driving of converter 110, and causes the driving of inverter 121 so as to reduce the counter electromotive voltage by field weakening control. Thus, although the power supply from power storage device 150 is stopped by the stop of the driving of converter 110, the driving of motor generator MG1 can be continued by the field weakening control with inverter 121 by using the electric power stored in smoothing capacitor C2. As a result, the application of an excessive counter electromotive voltage in motor generator MG1 to switching elements Q3 to Q8 of inverter 121 can be prevented. Then, when the revolution speed of motor generator MG1 is lowered to cause the counter electromotive voltage to be lower than the threshold value, in step S06, the contacts of relays SMR1 and SMR2 are opened to interrupt the power supply from power storage device 150 to PCU 200.

Figure 7:
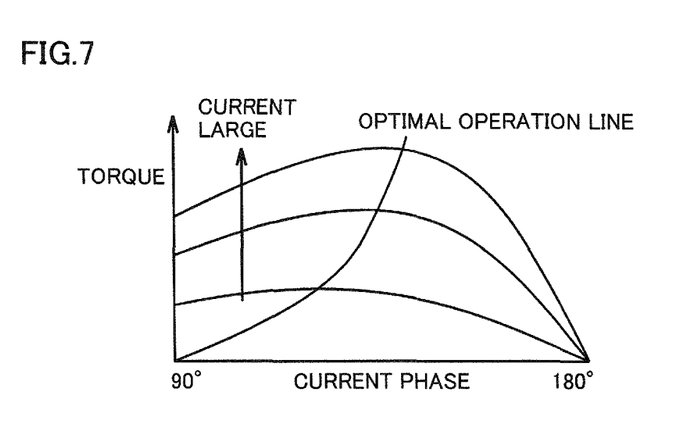
FIG. 7 shows relation between output torque and a current phase, when a motor current amplitude is kept constant.

FIG. 7 shows relation between output torque and a current phase, when a motor current amplitude is kept constant. As shown in FIG. 7, motor torque is at its maximum when a current phase angle is advanced past 90° This is because reluctance torque increases by the advance of the phase. A line that connects points where the torque is at its maximum on the graph of each current amplitude represents an optimal operation line of a motor generator where the current is at its minimum. When operated on this line, the motor generator can be driven efficiently to output large torque. Control to operate the motor generator on this line is referred to as maximum torque control. Specifically, a current command value is set corresponding to a torque command value so as to attain a current phase on the optimal operation line.

On the other hand, the current cannot be controlled if the counter electromotive voltage of the motor generator exceeds the inverter input voltage (voltage VH of smoothing capacitor C2). Therefore, when the motor is revolving at high speed, a current command value is generated in accordance with field weakening control of causing excitation in a direction that cancels counter electromotive power by increasing the absolute value of a d-axis current in accordance with an increase in revolution speed.

Figure 8:
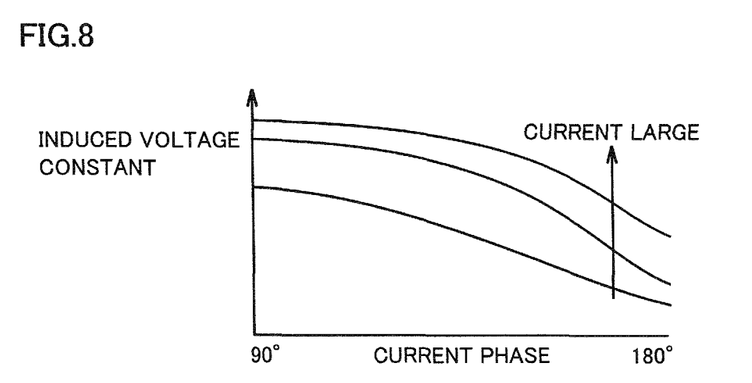
FIG. 8 shows the characteristics of an induced voltage constant per unit revolution speed of a motor generator relative to a current phase, when a current amplitude is kept constant.

FIG. 8 shows the characteristics of an induced voltage constant per unit revolution speed of a motor generator relative to a current phase, when a current amplitude is kept constant.

As shown in FIG. 8, an induced voltage constant decreases with the advance of a current phase. Setting a current command value corresponding to a torque command value so as to increase the absolute value of a d-axis current is equivalent to advancing the current phase on the graph of FIG. 8. That is, during the field weakening control, a current command value is set so as to advance the current phase relative to the torque command value.

As described above, if the counter electromotive voltage of motor generator MG1 exceeds the threshold voltage when the interlock mechanism of PCU 200 is activated, the counter electromotive voltage is reduced by driving motor generator MG1 by field weakening control. Thus, the application of an excessive counter electromotive voltage in motor generator MG1 to switching elements Q3 to Q8 of inverter 121 can be prevented, to avoid the activation of the shutdown function of inverter 121. As a result, the residual charge stored in smoothing capacitor C2 can be discharged by motor generators MG1 and MG2 in a short time.

(Second Modification)

Figure 9:
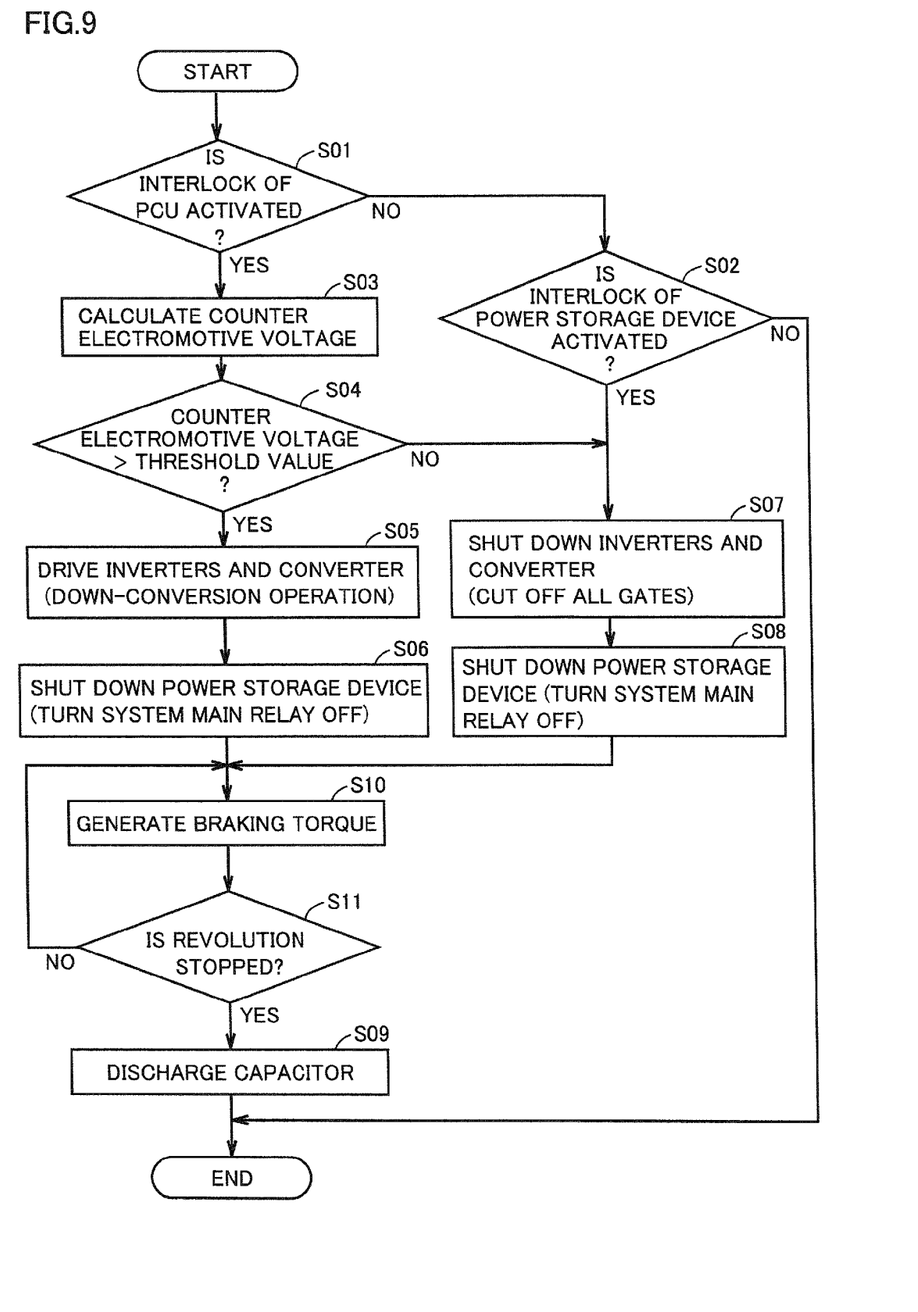
FIG. 9 is a flowchart illustrating the control of the PCU performed by the HV-ECU when the interlock mechanism is activated, in the motor drive system according to a second modification of the embodiment of the present invention.

FIG. 9 is a flowchart illustrating the control of PCU 200 performed by HV-ECU 350 when the interlock mechanism is activated, in the motor drive system according to a second modification of the embodiment of the present invention.

Referring to FIG. 9, HV-ECU 350 causes the interruption of power supply from power storage device 150 to PCU 200 in steps S01 to S09 similar to those in FIG. 4. Then, in step S10, HV-ECU 350 causes the generation and output of control signal PWI1 to inverter 121, so as to cause motor generator MG1 to generate braking torque (torque for suppressing the revolution of motor generator MG1).

In the processing of step S10, specifically, for example, control unit 390 (FIG. 3) causes the generation and output of a torque command value to inverter control unit 320, so as to cause motor generator MG1 to output torque in a direction opposite to the revolution direction. In response to the control command from control unit 390, inverter control unit 320 causes the generation of control signal PWI1 for driving motor generator MG1. Control signal PWI1 is output to inverter 121.

When the revolution speed of motor generator MG1 is reduced in response to the braking torque, in step S11, HV-ECU 350 causes a determination to be made of whether or not the revolution of motor generator MG1 has stopped. If the revolution of motor generator MG1 has not stopped (NO in the determination of step S11), the process returns to step S10.

If the revolution of motor generator MG1 has stopped (YES in the determination of step S11), on the other hand, in step S09, HV-ECU 350 causes the generation and output of control signals PWI1 and PWI2 to inverters 121 and 122, so as to discharge the residual charge stored in smoothing capacitor C2.

By forcibly stopping the revolution of motor generator MG1 after interrupting the power supply from power storage device 150 to PCU 200 as described above, the generation of a counter electromotive voltage in motor generator MG1 can be prevented. As a result, the residual charge stored in smoothing capacitor C2 can be discharged in a shorter time.

Figure 10:
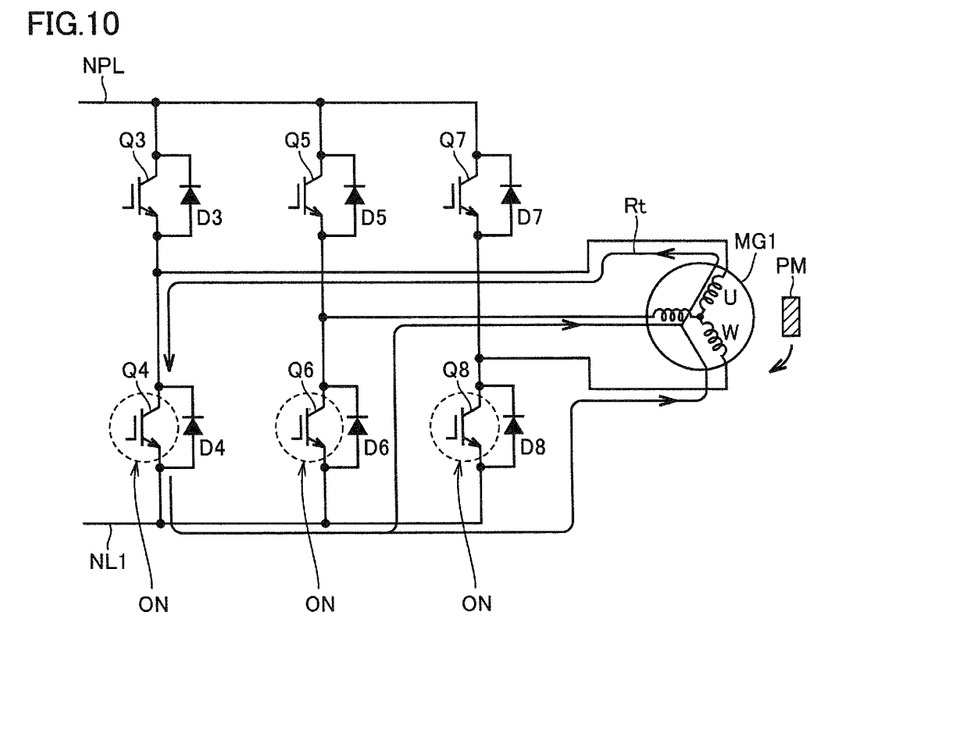
FIG. 10 illustrates the processing of step S10 shown in FIG. 9.

In the processing of step S10, a similar effect can be obtained by generating drag torque by electromagnetic action from motor generator MG1. Specifically, as shown in FIG. 10, for example, switching element Q4 of U-phase arm 123, switching element Q6 of V-phase arm 124 and switching element Q8 of W-phase arm 125 of inverter 121 are controlled so that they are simultaneously turned on. Controlling switching elements of one of upper and lower arms through multi-phase arms of an inverter in such a manner that the switching elements are simultaneously turned on is hereinafter referred to as "multi-phase ON control." Controlling switching elements of one of upper and lower arms through three-phase arms of an inverter in such a manner that the switching elements are simultaneously turned on as in this embodiment is referred to as "three-phase ON control."

When a magnet PM mounted on a rotor (not shown) of motor generator MG1 rotates by the three-phase ON control of inverter 121, a current path Rt is formed through switching elements Q4, Q6 and Q8. Thus, motor currents of three phases showing AC waveforms of amplitudes substantially identical to each other are induced in a U-phase coil winding, a V-phase coil winding and a W-phase coil winding of motor generator MG1. The induced motor current then forms a revolving magnetic field, causing the generation of drag torque in motor generator MG1.

Figure 11:
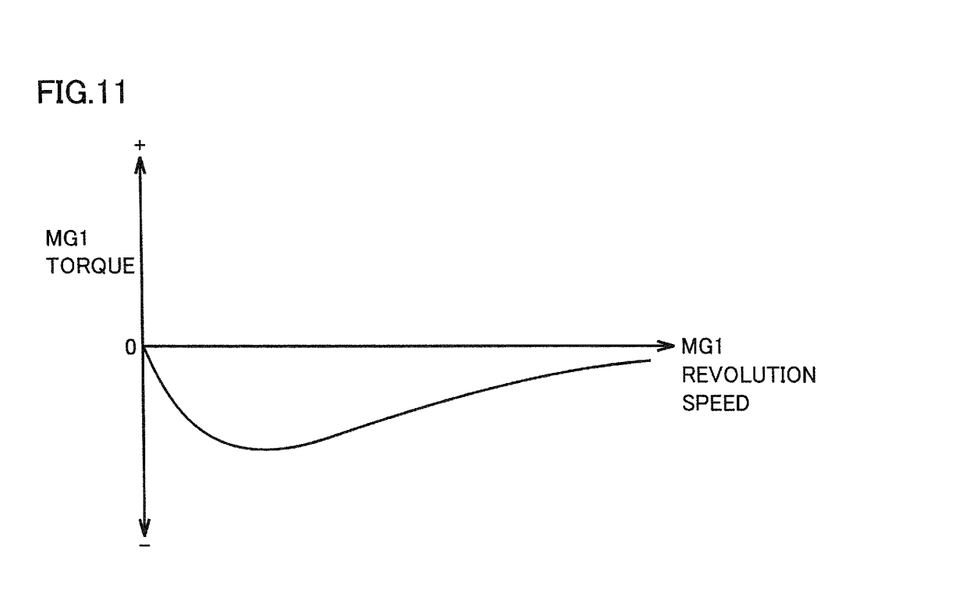
FIG. 11 shows relation between torque and revolution speed of a motor generator MG1 when three-phase ON control is performed.

FIG. 11 shows relation between torque and revolution speed of motor generator MG1 when the three-phase ON control is performed. As shown in FIG. 11, the drag torque (negative torque) generated by motor generator MG1 increases with a decrease in revolution speed of motor generator MG1. By performing the three-phase ON control when the revolution speed of motor generator MG1 decreases, therefore, the revolution of motor generator MG1 can be quickly stopped.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The present invention is applicable to a motor drive system incorporating an interlock mechanism for interrupting an output of a mounted power storage device in accordance with operation by an operator, and a vehicle incorporating this motor drive system.

REFERENCE SIGNS LIST

100 vehicle; 110 converter; 120, 121, 122 inverter; 123 U-phase arum; 124 V-phase arm; 125 W-phase arm; 150 power storage device; 160, 210 interlock switch; 170, 180 voltage sensor; 190 system main relay; 220 engine; 230, 240 current sensor, 250 power split device; 260 drive wheel; 270, 280 revolution angle sensor; 310 converter control unit; 320 inverter control unit; 351, 352 interlock circuit; 353 input/output interface; 354 bus; 358 memory; 360 interlock detection unit; 370 counter electromotive voltage calculation unit; 380 voltage determination unit; 390 control unit; C1, C2 smoothing capacitor; D1 to D8 diode; L1 reactor; MG1, MG2 motor generator; NL1 ground line; PL1 power supply line; Q1 to Q8 switching element; R1 resistor; SMR1, SMR2 relay; SP service plug.

The invention claimed is:

1. A motor drive system comprising:
   a rechargeable power storage device;
   a power control unit configured to drive a motor by using electric power supplied from said power storage device;
   an open/close device disposed on a power line connecting said power storage device to said power control unit;
   a first interlock mechanism configured to be activated to open said open/close device in response to transition to an operable state of an interruption device for interrupting an output of said power storage device;
   a second interlock mechanism configured to be activated to open said open/close device in response to transition to an openable state of a case containing said power control unit; and
   a control device for controlling said power control unit and said first and second interlock mechanisms,
   said power control unit including
      an inverter for converting the electric power from said power storage device to electric power for driving said motor, and
      a capacitor connected to a terminal of said inverter on the side of said power storage device,
   said control device being configured to perform, when said first interlock mechanism is activated, a first process of opening said open/close device after shutting down said power control unit, and to perform, when said second interlock mechanism is activated, a second process of opening said open/close device while driving said power control unit, instead of said first process, depending on a counter electromotive voltage generated by said motor.

2. The motor drive system according to claim 1, wherein during said second process, said control device controls a voltage applied to said capacitor by driving said power control unit.

3. The motor drive system according to claim 2, wherein said power control unit further includes a converter provided between said power storage device and said capacitor, and
   during said second process, said control device controls said inverter and said converter so as to supply electric power from said power control unit to said power storage device.

4. The motor drive system according to claim 2, wherein during said second process, said control device controls said inverter so as to drive said motor by field weakening control.

5. The motor drive system according to claim 1, wherein said control device controls said inverter so as to discharge residual charge stored in said capacitor, after opening said open/close device.

6. The motor drive system according to claim 5, wherein said control device controls said inverter so as to cause said motor to generate braking torque after opening said open/close device, and controls said inverter so as to discharge the residual charge stored in said capacitor when a revolution speed of said motor decreases by said braking torque.

7. The motor drive system according to claim 6, wherein said control device controls said inverter so as to cause said motor to generate braking torque based on electromagnetic action.

* * * * *